United States Patent [19]

Grathoff

[11] Patent Number: 5,238,346
[45] Date of Patent: Aug. 24, 1993

[54] CONTINUOUS-CONVEYANCE BULK-CARGO SHIP UNLOADER

[75] Inventor: Hartmut Grathoff, Wendelstein, Fed. Rep. of Germany

[73] Assignee: Man Gutehoffnungshütte AG, Oberhausen, Fed. Rep. of Germany

[21] Appl. No.: 900,154

[22] Filed: Jun. 17, 1992

[30] Foreign Application Priority Data

Jul. 30, 1991 [DE] Fed. Rep. of Germany ....... 4125109

[51] Int. Cl.$^5$ .............................................. B63B 27/22
[52] U.S. Cl. .............. 414/140.7; 414/140.9; 414/141.6; 414/141.4; 198/611
[58] Field of Search ............... 414/140.7, 140.8, 140.9, 414/141.4, 141.6; 198/626.2, 611

[56] References Cited

FOREIGN PATENT DOCUMENTS

| | | | |
|---|---|---|---|
| 264130 | 11/1987 | Japan | 414/140.7 |
| 064927 | 3/1989 | Japan | 414/140.7 |
| 092126 | 4/1989 | Japan | 414/140.7 |
| 495255 | 3/1976 | U.S.S.R. | 414/140.7 |

*Primary Examiner*—D. Glenn Dayoan
*Attorney, Agent, or Firm*—Max Fogiel

[57] ABSTRACT

A continuous-conveyance bulk-cargo ship unloader. It has a pickup at the bottom of an upright screw conveyor. The screw conveyor rotates around a vertical axis and relays a more or less horizontally free-flowing stream of bulk material to a sandwiched-belt conveyor accommodated in an elephant trunk. The object of the present invention is to ensure that the sandwiched-belt conveyor will be supplied to capacity as effectively as possible and with as little friction as possible. The belts that comprise the sandwiched-belt conveyor (4 & 5) are curved at the bottom. The cylinder (10) that deflects the counterforce-application belt (9) is in approximately vertical alignment with the cylinder (12) that deflects the force-application belt (11). Both cylinders demarcate an intake-slot throat (13). The intake-slot throat intercepts the particles (8) of bulk material leaving the top of the screw conveyor (3) in a horizontal or upward-sloping trajectory. The screw conveyor (3) and its associated relay section (3e) are at an angle of 0° to 15° to the axis of the sandwiched-belt conveyor. The sandwiched-belt conveyor travels as rapidly or approximately as rapidly as the particles travel in their trajectory.

15 Claims, 5 Drawing Sheets

CONTINUOUS-CONVEYANCE BULK-CARGO SHIP UNLOADER

BACKGROUND OF THE INVENTION

The invention is a continuous-conveyance bulk-cargo ship unloader. It has a pickup at the bottom of an upright screw conveyor. The screw conveyor rotates around a vertical axis and relays a more or less horizontally free-flowing stream of bulk material to a sandwiched-belt conveyor accommodated in an elephant trunk.

A ship unloader is known from the still unpublished P 4 116 467. It has a pickup at the bottom in the form of a scooper head or bucket wheel. The pickup relays the material radially inward to a vertical conveyor, which can be a screw conveyor for example.

The screw conveyor comprises a preferably two-thread screw that fits snugly into a cylindrical housing. The screw rotates rapidly enough to fling the material that has penetrated between its threads against the inner surface of the housing. The friction between the material and the inner surface decreases the material's peripheral speed in relation to that of the screw, and the material is forced up against the screw's pitch.

The material arrives at an opening higher up in the housing. Since its centrifugal motion is no longer impeded by the housing's inner surface, the material will leave the conveyor in a free tangential trajectory and arrive in the intake of another perpendicular conveyor.

SUMMARY OF THE INVENTION

The object of the present invention is to improve the known means of relaying bulk cargo from a screw conveyor with a pickup to a sandwiched-belt conveyor to the extent that the latter will be supplied to capacity as effectively as possible and with as little friction as possible.

This object is attained in accordance with the invention as recited in the claim. The screw conveyor and the opening in its relay section are positioned in relation to the axis of the sandwiched-belt conveyor such that all the material will be flung as intended in a horizontal or upward-sloping trajectory into the sandwiched-belt conveyor's laterally open intake-slot throat.

The screw conveyor with an integrated pickup in conjunction with a sandwiched-belt conveyor in accordance with the invention will result in a continuous-conveyance ship unloader weighing substantially less than the state-of-the-art The invention provides design improvements that increase the ratio of material conveyed to the weight of the equipment and decrease the wear on the sandwiched-belt conveyor's belts.

The screw conveyor with the pickup flings the particles of material through a relay section in a free-flowing horizontal or upward-sloping trajectory against the sandwiched-belt conveyor's counterforce-application belt, which curves at that point.

The peripheral speed of the screw conveyor is 10 to 20 m/sec. The material travels helically along the inner surface of the housing and leaves through the relay section at 5 to 10 m/sec. The speed of the upright conveyor must at least approximately equal that of the trajectory of material arriving at a shallow angle to the surface of the belt to prevent or minimize friction wear on the belt.

Due to curve in the belt in the vicinity of the intake-slot throat, centrifugal force will fling the material up and against the counterforce-application belt. Before the its upward motion can be decelerated to any extent by gravity, the material will arrive below the force-application belt, which is ascending at the same speed as the counterforce-application belt.

The force-application belt can be rubber. The surface that comes into contact with the material can be either smooth or textured. The belt can be positioned by resiliently mounted backing rollers. It can also be made of resilient foam and positioned by backing rollers either directly or by way of an intermediate belt (cf. German 2 236 102, 2 333 100, and 2 262 115). The foam belt has a particular structure and plies and consists of a core of foam rubber or similar material and of a rubber coating or skin secured to the core.

The two belts are for practical purposes both deflected in the vicinity of the articulation between the unloader's elephant trunk and its boom. The counterforce-application belt extends into the center of the equipment, where it is powered by a motorized cylinder. The force-application belt can be reversed just downstream of where it is deflected in the vicinity of the articulation to seal off the material and prevent dust. The force-application belt need not as a rule have its own power, but will advance due to the friction generated by the pressure needed to entrain the material.

The system described herein, which combines a vertical with a horizontal conveyor, eliminates the needs for a separate relay and for a motor for the vertical conveyor in the vicinity of the articulation. Again the material will not have to be raised higher than necessary, as it is when transferred from a separate vertical conveyor to a horizontal conveyor.

The horizontal-conveyer intake-slot throat consists of the counterforce-application belt, which is concave downstream and untroughed, of the force-application belt, which is convex downstream, and of the projecting walls of the screw-conveyor relay section. The walls extend as close to the belts as possible and can also have skim strips to seal off the residual gap between the walls and the belts.

In the vicinity of the intake-slot throat's concave section the counterforce-application belt is positioned by truncated rollers at the edge. Its curve and transverse rigidity keep the counterforce-application belt flat across the direction of travel. The flatness is augmented in that the tension on the belt is lowest at this point.

There are three reasons why the horizontal conveyer can curve less than 90° at the bottom of the elephant trunk.

a) The material is traveling inside the screw conveyor at a velocity with both a peripheral and an axial component, resulting in a slightly upwards initial orientation on the part of the free trajectory of material inside the relay section.

b) The material impacts the counterforce-application belt at an angle of approximately 10° to 20°.

c) The screw conveyor's axis will preferably be at an angle of 0° to 15° to that of the horizontal conveyer.

BRIEF DESCRIPTION OF THE DRAWINGS

One embodiment of the invention will now be specified with reference to the schematic drawings, wherein.

DESCRIPTION OF THE PREFERRED EMBODIMENTS

Figure 1:
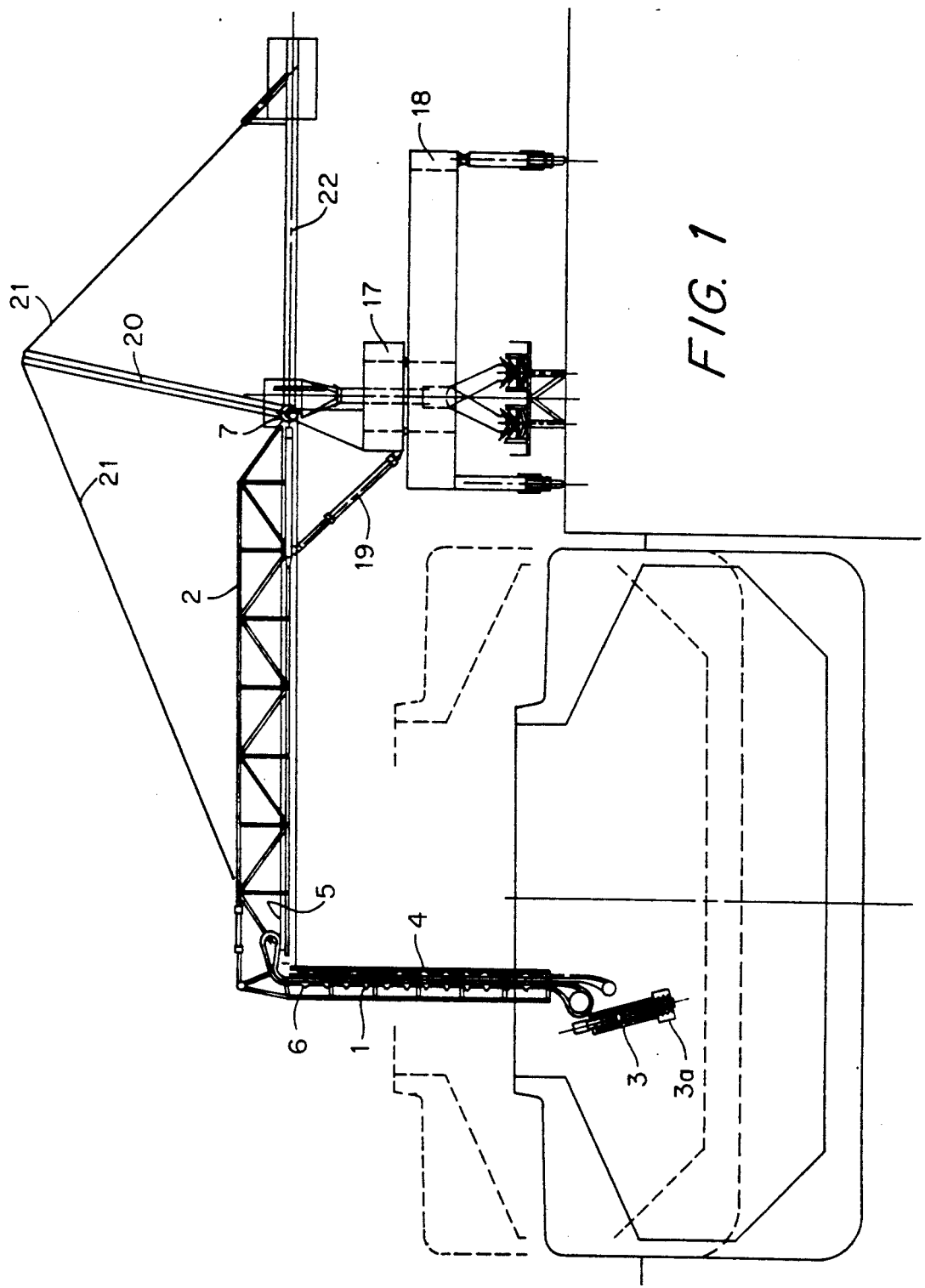
FIG. 1 is a side view of a continuous-conveyance ship unloader.

FIG. 1 illustrates in principle a ship unloader in position for transferring bulk goods. An unloading elephant trunk 1 is suspended from a point of articulation on a boom 2.

The over-the-water half of the ship unloader includes a screw conveyor 3 and a sandwiched-belt conveyor with two sections. The vertical section 4 of the sandwiched-belt conveyor accommodated in a framework 6 constitutes elephant trunk 1. The elephant trunk can swing as much as 20° in and out of its upright rest position. Screw conveyor 3 is secured to the bottom of the vertical section 4 of sandwiched-belt conveyor 4 and 5. Vertical section 4 merges into a horizontal section 5 that extends along a boom 2 to a point of deposit in the vicinity of a motorized belt-drive cylinder 7. Framework 6 also accommodates a relay section and deflection cylinders for the counterforce-application belt and force-application belt.

The on-land half of the ship unloader comprises a turntable 17, a gantry crane 18, a boom lifter 19, a pylon 20, guy cables 21, and a boom-counterweight arm 22.

Figure 2:
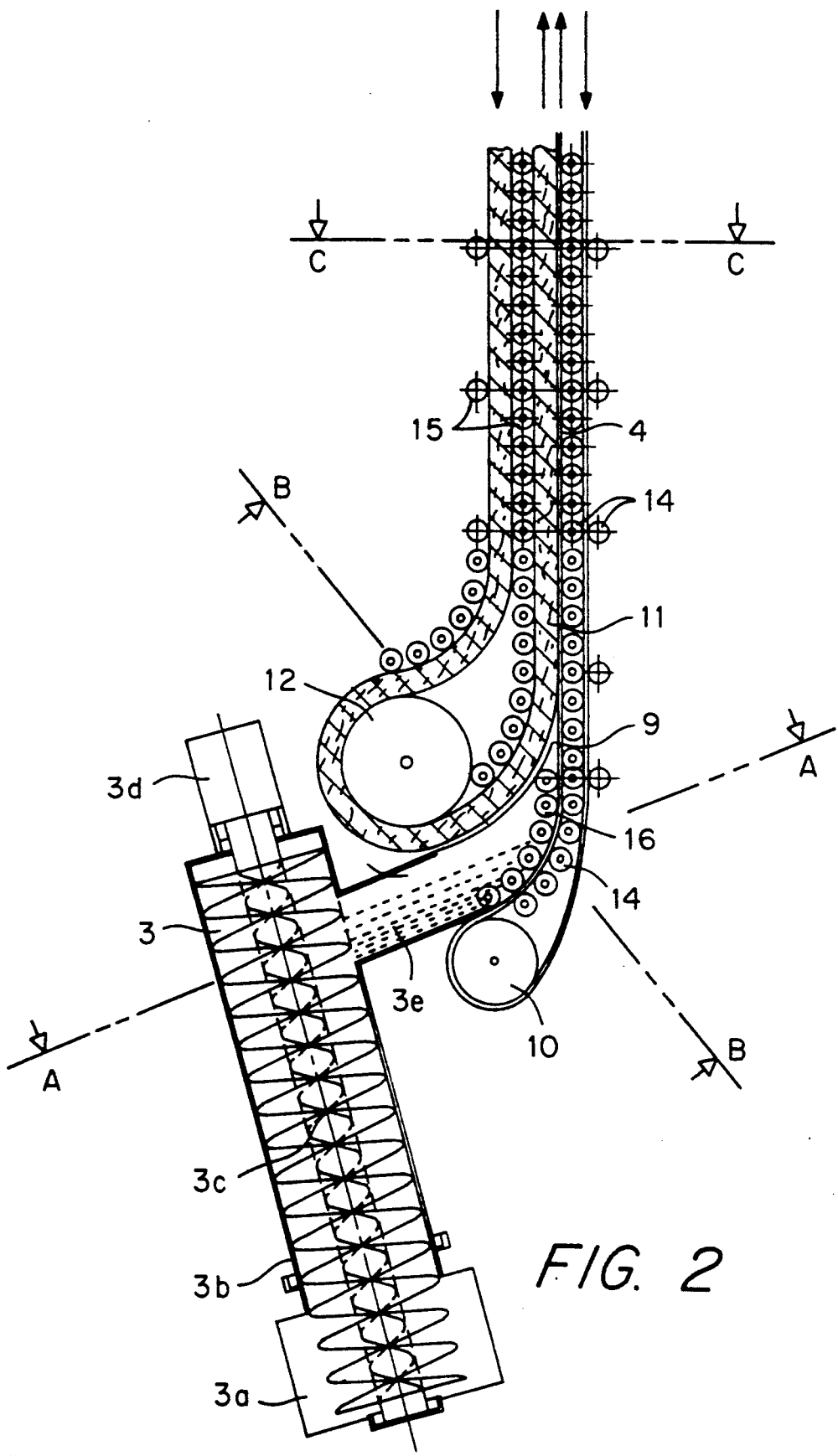
FIG. 2 is a detail of where the material is relayed from the screw conveyor to the sandwiched-belt conveyor.
Figure 3:
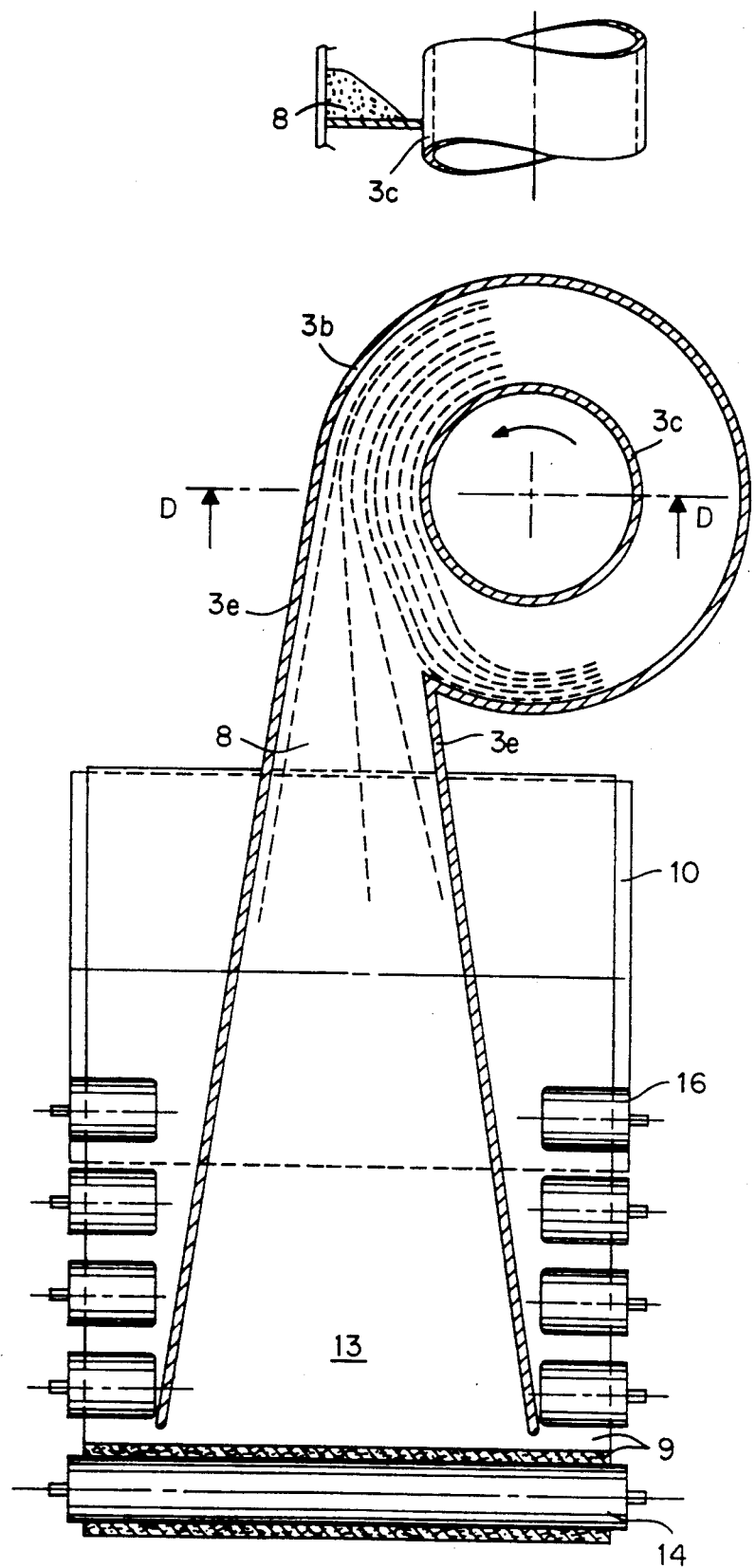
FIG. 3 is a section along the line A—A in FIG. 2.
Figure 4:
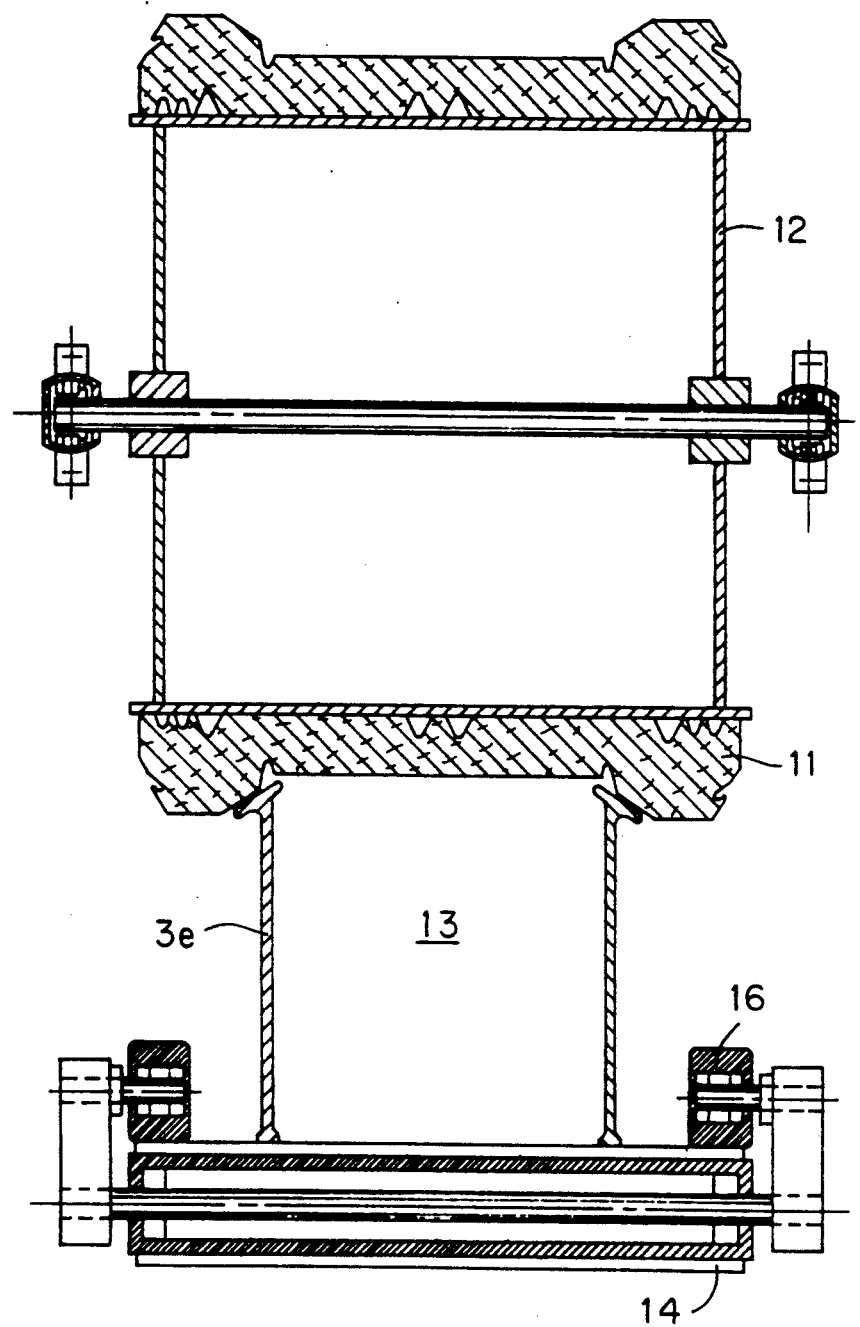
FIG. 4 is a section along the line B—B in FIG. 2.
Figure 5:
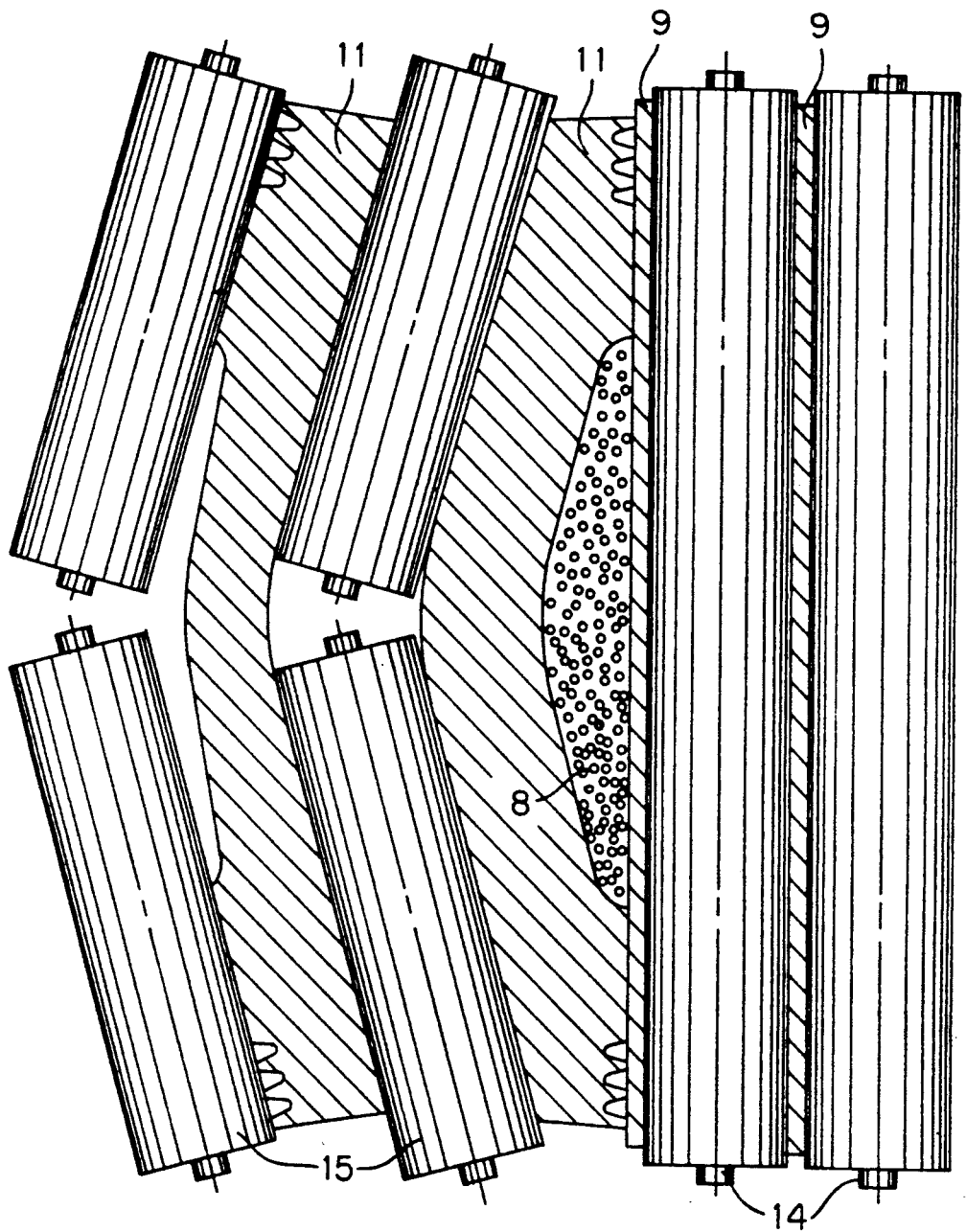
FIG. 5 is a section along the line C—C in FIG. 2.

FIG. 2 is a detail illustrating where the material is transferred from screw conveyor 3 to a curve in vertical section 4 with lines A—A, B—B, and C—C representing the sections illustrated in FIGS. 3 through 5.

Screw conveyor 3 comprises a bulk-material pickup 3a, a cylindrical housing 3b, a screw 3c, motors 3d for the pickup and screw, and a relay section 3e.

The vertical section 4 of the sandwiched-belt conveyor is accommodated in the framework 6 of elephant trunk 1 and comprises, where the material is transferred, a curved counterforce-application belt 9 that travels around a deflection cylinder 10 and a force-application belt 11 that travels around another deflection cylinder 12. The belts are positioned by rollers 14, 15, and 16. The curves in counterforce-application belt 9 and force-application belt 11 and the position of the cylinder 12 that deflects force-application belt 11 above the cylinder 10 that deflects counterforce-application belt 9 result in an intake-slot throat 13, which the screw conveyor's relay section 3e projects into.

The bulk material is picked up in the ship's hold by bulk-material pickup 3a, a scooper that rotates around a perpendicular axis. Pickup 3a transfers the material radially inward to screw 3c, which preferably has two threads. The screw rotates rapidly enough to fling the material penetrating between the threads against the inner surface of housing 3b. The resulting friction is enough to force the material up against the pitch of the threads.

The material arrives at a hole through the wall of housing 3b, which can no longer block it, and will leave the threads at a tangent as illustrated in the detail in FIG. 3. Screw conveyor 3 flings the particles 8 of material through relay section 3e in a free horizontal or upward-sloping trajectory against the counterforce-application belt 9 of the sandwiched-belt conveyor at vertical section 4, which is concave at that point and demarcates intake-slot throat 13 in conjunction with the convex force-application belt 11 and the projecting walls of the relay section. The axis of screw conveyor 3 and its integrated bulk-material pickup 3a is at an angle of 0° to 15° to the axis of vertical section 4. Sandwiched-belt conveyor 4 and 5 travels approximately as rapidly as particles 8. Due to the curve in counterforce-application belt 9 and to the equivalence in speed, particles 8 will arrive as intended in intake-slot throat 13 without 4 increasing the wear on belts 9 and 11. The particles will accordingly be constantly diverted upright out of their 6 horizontal or upward-sloping trajectory.

FIG. 3 is a section along the line A—A in FIG. 2 illustrating how screw conveyor 3 flings particles 8 through relay section 3e and intake-slot throat 13 and against counterforce-application belt 9.

FIG. 4 is a section along line B—B through the cylinder 12 that deflects force-application belt 11 and through intake-slot throat 13, including its walls, illustrating the full-length rollers 14 and truncated rollers 16 that support counterforce-application belt 9.

FIG. 5 is a section along line C—C through the vertical section 4 of the sandwiched-belt conveyor. Rollers 15 press force-application belt 11 against counterforce-application belt 9, sandwiching particles 8 of bulk material between them. The particles are raised to where the sandwiched-belt conveyor turns horizontal.

I claim:

1. A continuous-conveying bulk-cargo ship unloader with an elephant trunk comprising: a sandwiched belt conveyor with an axis; an upright screw conveyor with a bottom and a top and rotating about a vertical axis for transmitting through a transmitting section a substantially horizontal free-flowing directed stream of bulk material to said sandwiched-belt conveyor in an elephant trunk; pickup means at said bottom of said screw conveyor; said sandwiched-belt conveyor having curved belts with a curved bottom section; said belts being a base belt and a top belt; a first cylinder for deflecting said top belt, and a second cylinder for deflecting said base belt, said first cylinder and said second cylinder being substantially vertically aligned with one another; an intake-slot throat defined by said first cylinder and said second cylinder and intercepting particles of bulk material leaving horizontally said top of said screw conveyor in a predetermined path, said screw conveyor and said transmitting section being at an angle of 0° to 15° to said axis of said sandwiched-belt conveyor, said sandwiched belt conveyor traveling at substantially the same speed as said particles; said direct stream of bulk material being transmitted into said base belt, said base belt traveling at the same speed as said particles, said particles traveling in free fall and striking a curved region of said base belt to avoid guiding said particles on said base belt, said particles being pressed against said base belt by centrifugal force in said curved region and being covered by said top belt only after passing said curved region.

2. A continuous-conveying bulk-cargo ship unloader with an elephant trunk comprising: a sandwiched belt conveyor with an axis; an upright screw conveyor with a bottom and a top and rotating about a vertical axis for transmitting through a transmitting section a substantially horizontal free-flowing directed stream of bulk material to said sandwiched-belt conveyor in an elephant trunk; pickup means at said bottom of said screw conveyor; said sandwiched-belt conveyor having curved belts with a curved bottom section; said belts being a base belt and a top belt; a first cylinder for deflecting said top belt, and a second cylinder for deflecting said base belt, said first cylinder and said second cylinder being substantially vertically aligned with one another; an intake-slot throat defined by said first cylinder and said second cylinder and intercepting particles of bulk material leaving said top of said screw conveyor in a predetermined upward inclined path, said screw conveyor and said transmitting section being at an angle of 0° to 15° to said axis of said sandwiched-belt conveyor, said sandwiched belt conveyor traveling at substantially the same speed as said particles; said directed stream of bulk material being transmitted into said base belt, said base belt traveling at the same speed as said particles, said particles traveling in free fall and striking a curved region of said base belt to avoid guiding said particles on said base belt, said particles being pressed against said base belt by centrifugal force in said curved region and being covered by said top belt only after passing said curved region.

3. A ship unloader as defined in claim 1, wherein said top belt is made of rubber.

4. A ship unloader as defined in claim 1, wherein said top belt is of resilient foam.

5. A ship unloader as defined in claim 1, wherein said screw conveyor has a peripheral speed of 10 to 20 meters per second.

6. A ship unloader as defined in claim 1, wherein the material leaving said transmitting section has a speed of 5 to 10 meters per second.

7. A ship unloader as defined in claim 1, wherein the material travels inside said screw conveyor at a velocity having both a peripheral and an axial component to provide an upward motion of the material inside the transmitting section.

8. A ship unloader as defined in claim 1, wherein the material impacts said top belt at an angle of substantially 10° to 20°.

9. A ship unloader as defined in claim 2, wherein said top belt is of rubber.

10. A ship unloader as defined in claim 2, wherein said top belt is of resilient foam.

11. A ship unloader as defined in claim 2, wherein said screw conveyor has a peripheral speed of 10 to 20 meters per second.

12. A ship unloader as defined in claim 2, wherein said material leaves said transmitting section at a speed of 5 to 10 meters per second.

13. A ship unloader as defined in claim 2, wherein the material travels inside said screw conveyor at a velocity having both a peripheral and an axial component to provide an upward motion of material inside said transmitting section.

14. A ship unloader as defined in claim 2, wherein the material impacts the top belt at an angle of substantially 10° to 20°.

15. A continuous-conveying bulk-cargo ship unloader with an elephant trunk comprising: a sandwiched belt conveyor with an axis; an upright screw conveyor with a bottom and a top and rotating about a vertical axis for transmitting through a transmitting section a substantially horizontal free-flowing directed stream of bulk material to said sandwiched-belt conveyor in an elephant trunk; pickup means at said bottom of said screw conveyor; said sandwiched-belt conveyor having curved belts with a curved bottom section; said belts being a base belt and a top belt; a first cylinder for deflecting said top belt, and a second cylinder for deflecting said base belt, said first cylinder and said second cylinder being substantially vertically aligned with one another; an intake-slot throat defined by said first cylinder and said second cylinder and intercepting particles of bulk material having horizontally said top of said screw conveyor in a predetermined path, said screw conveyor and said transmitting section being at an angle of 0° to 15° to said axis of said sandwiched-belt conveyor, said sandwiched belt conveyor traveling at substantially the same speed as said particles; said directed stream of bulk material being transmitting into said base belt, said base belt traveling at the same speed as said particles, said particles traveling in free fall and striking a curved region of said base belt to avoid guiding said particles on said base belt, said particles being pressed against said base belt by centrifugal force in said curved region and being covered by said top belt only after passing said curved region; said top belt being of rubber; said screw conveyor having a peripheral speed of 10 to 20 meters per second, said material leaves said transmitting section at a speed of 5 to 10 meters per second, said material travels inside said screw conveyor at a velocity having both a peripheral and an axial component to provide an upward motion of the material inside said transmitting section, said material impacting said top belt at an angle of substantially 10° to 20°.

* * * * *